PROCESS FOR MAKING SOLID STATE CURRENT LIMITERS
AND OTHER SOLID STATE DEVICES

Filed July 31, 1967 4 Sheets-Sheet 1

INVENTOR.
PHILIPPE F. VAN EECK
BY Harry Kotlar
ATTORNEY.

INVENTOR.
PHILIPPE F. VAN EECK
BY Harry Kotlar
ATTORNEY.

PROCESS FOR MAKING SOLID STATE CURRENT LIMITERS AND OTHER SOLID STATE DEVICES

Filed July 31, 1967 4 Sheets-Sheet 3

INVENTOR.
PHILIPPE F. VAN EECK
BY Harry Kotler
ATTORNEY.

INVENTOR.
PHILIPPE F. VAN EECK
BY
Harry Kalan
ATTORNEY.

3,586,743

PROCESS FOR MAKING SOLID STATE CURRENT LIMITERS AND OTHER SOLID STATE DEVICES

Philippe F. Van Eeck, 11827 Kearsarge St., Los Angeles, Calif. 90049

Continuation-in-part of application Ser. No. 453,089, May 4, 1965. This application July 31, 1967, Ser. No. 657,304
Int. Cl. G21c *21/00*
U.S. Cl. 264—.5 31 Claims

ABSTRACT OF THE DISCLOSURE

A method for fabricating solid state current limiters and other solid state devices by forming and orienting a plurality of unbalanced dipoles from two groups of conductive particles within a hardenable dielectric matrix by simultaneous application of at least two force fields comprising an electrostatic field and a magnetic field. A third force field obtained from radioactive materials may additionally be utilized. One group of conductive particles is selected from the group of elements having an even number of electrons in its outer shell and having a magnetic moment. The other group of conductive particles is selected from the group of elements having an odd number of electrons in its outer shell. The electrostatic force field is of a time-varying, periodic or pulse waveform, either alternating current or pulsating direct current, and is preferably of a relatively high frequency. The magnetic force field is aroused by either a permanent magnet or an electromagnet and may be shaped to focus the electrostatic force field.

SPECIFICATION

The present invention is a continuation-in-part of copending application, Ser. No. 453,089, filed May 4, 1965, entitled Process for Orientation of Conductive Particles in Plastic and Products Obtained Thereby.

The present invention relates to a method for fabricating solid state current limiters and other solid state devices and, in particular, to such a method for forming and orienting a plurality of unbalanced dipoles from two groups of conductive particles within a hardenable dielectric matrix by simultaneous application of at least two force fields comprising an electrostatic field and a magnetic field. A third force field obtained from radioactive materials may additionally be utilized.

One group of conductive particles is selected from the group of elements having an even number of electrons in its outer shell and having a magnetic moment. The other group of conductive particles is selected from the group of elements having an odd number of electrons in its outer shell. By subjecting these groups of materials to the process of this invention while in a hardenable dielectric matrix, it is believed that they are brought into an association which forms couples or dipoles, and every dipole consists of one element selected from one group and another element selected from the other group to effect a dipole having an unbalanced electrostatic moment. In general, the class of elements of the first group comprises iron, cobalt and nickel, all of which have strong magnetic moments and have two electrons in their outer orbits.

The electrostatic force field is always of a time-varying, periodic or pulse waveform, either alternating current or pulsating direct current, and is preferably of a relatively high frequency. The magnetic force field is aroused by either a permanent magnet or an electromagnet and may be shaped to focus the electrostatic force field. The third force field, obtained from radioactive particles, may be utilized in addition. Therefore, as used herein, a force field is defined to mean an electrostatic, a magnetic or a radioactive field.

The devices produced by the present invention all have the common characteristics that the two groups of particles form a plurality of dipoles or electrets, wherein each of the dipoles comprises a pair of particles selected from each group, and that the plurality of dipoles are similarly oriented or polarized. When similarly oriented, the orientation of the dipoles cause any one device to have a specific ohmic path. During use, the electronic order of the orientation may be changed into another electronic order of orientation to effect a stable change in ohmic path. For example, one particular device produced by the present invention is a solid state switch which is either conductive or nonductive, depending upon the electronic order imposed during operation. When the switch is conductive, the orientation of the dipoles and the electronic order of the orientation presents a specific ohmic path having a specific resistance which is a function of the electrical characteristics of the particular particles, of the percentage inclusion of one group of conductive particles with respect to the other, of the size of the particles, and of the geometry of the device. When the switch is nonconductive, the electronic order of the orientation changes to alter the characteristics of the ohmic path so that the switch has a resistance of such high magnitude that the nonconductive switch effectively prevents the flow of current therethrough. In this latter state, the plurality of dipoles have an electronic order which is different from that of the conductive state.

It is theorized that the orientation of the dipoles undergoes a change in configuration from one electronic order to another electronic order, probably by a mechanism of dipole rotation. Because of the varying configurations of the electronic orders of orientation of the dipoles to cause the switch to be either conductive or nonconductive, the dipoles may be said to show order-disorder states, that is, the orientation of the dipoles undergoes a transition from one electronic order to another electronic order. In both the conductive and non-conductive states of the switch, the electronic orders are highly stable and can transit only under specified conditions.

Each such switch has a specific power rating which is determined primarily by the total or bulk resistance of the dipoles and the dielectric constant of the matrix material. The bulk resistance, in turn, as stated above, is determined by the combined electrical characteristics of and interactions between the particular particles employed, their atomic weights, their molecular sizes, and the respective percentages of each group of particles. In order to change the orientation of the dipoles in a switch from a conductive electronic order to a nonconductive electronic order, an overload current must be supplied to the switch, which overload current is determined by the switch's power rating. The overload current causes the electronic order of orientation of the dipoles to undergo an order transition so that the switch becomes nonconductive. Thus, the conductive switch is current controllable. Since the resistance in the nonconductive state is of extremely high magnitude, no effective current may pass through the switch. To reorder the orientation of the dipoles in the switch from its nonconductive ohmic path to its conductive ohmic path, it is necessary to supply a specific value of voltage to the dipoles to reestablish the conductive order. Thus, the nonconductive switch is voltage controllable. This voltage is also determined by the power rating and the "turn-on" power is equal to the "turn-off." However, if the same voltage were consistently supplied to the switch, at the point where it becomes fully conductive because the conductive order of dipole orientation is formed, the device would automatically turn off again. Therefore, it is necessary to employ a current limiting means so that the total value of voltage across the switch decreases as the dipoles resume their conductive order.

A switch may be provided with radioactive particles having varying percentages with respect to the total amount of conductive particles. With a small percentage of radioactive particles, the switch dipoles then become more easily resettable from their nonconductive order to their conductive order. With a larger percentage of radioactive particles, the switch will automatically become conductive upon removal of the cause of overload current. By means of this inclusion, the "turn-on" power is thus materially reduced or lessened with respect to the "turn-off" power. In addition, the radioactive particles enable the device to operate at a working voltage which is lower than that had no radioactive particles been employed. The radioactive particles also enable pressure-sensitive and temperature-sensitive devices to exhibit good linear characteristics and small hysteresis with a high gauge factor.

These devices are also useful for other applications with or without the inclusion of radioactive particles. For example, the supporting matrix material may be made sensitive to heat so that the order-disorder transitions will result in a greater or lesser flow of current, yielding a device which is responsive to an increase or decrease of temperature. The two groups of particles, if oriented and formed into dipoles in a matrix having at most a low coefficient of thermal expansion, for example, quartz, produce a device which has a negative resistance, i.e., the resistance varies inversely to a change of temperature. By adding sufficient non-conductive material having a positive resistance to the matrix, the device may be made to have a resistance which does not vary with a change of temperature or which will be positive, that is, the resistance will change in direct proportion to a change in temperature. Such positive resistance materials include aluminum oxide and silicon carbide.

On the other hand, the matrix may be sufficiently deformable so that the resistance will change upon application of even minute pressures, thereby causing a change in flow of current.

As stated above, it is possible to produce each one of the devices as well as every other device which is formed from a plurality of such oriented unbalanced dipoles by means of the present invention. Basically, two groups of conductive particles are mixed in specified proportions with, if desired, a specified percentage of radioactive material. One group of conductive particles is chosen from those elements of the Periodic Table having even numbers of electrons in their outer shells and possessing a magnetic moment which is capable of being influenced by a magnetic field. The other group of conductive particles is chosen from those elements of the Periodic Table having odd numbers of electrons in their outer shells. The two groups of conductive particles are thoroughly and uniformly mixed with an uncured or unbonded dielectric matrix material. The mixture or portions thereof is then compressed mechanically, if needed, and is placed within an apparatus designed to exert an electrostatic force field and a magnetic force field upon the mixture. At the same time, the matrix material is hardened. The electrostatic force field is of a time-varying, periodic or pulse waveform, either an alternating current field or a pulsating direct current field, preferably of high frequency. The magnetic force field may be generated by either a permanent magnet or an electromagnet, the use of one or the other depending upon the facilities available, the amount of concentrated force needed to be exerted upon the particles or the degree of shaping desired to focus the electrostatic force field.

The high frequency electrostatic field is designed to include the frequency or frequencies and their corresponding harmonics which correspond to one or more harmonics of the natural frequency or frequencies of the particle of both groups. When the high frequency electrostatic field, in combination with the magnetic field, is attuned to the harmonics of the natural frequency of the particles, the particles resonate to facilitate formation of the dipoles or electrets comprising one of each of the particles, perhaps by a factor of electron spin resonance which is dependent upon a proper balance between the magnetic field and the electrostatic field. Since it is extremely difficult to obtain the exact attunement between the high frequency electrostatic field and the frequency at which the particles will resonate, the high frequency electrostatic field is designed to include several high frequencies which are very rich in harmonics, among which is the proper tuning frequency or frequencies for the particles.

In addition to causing the particles to resonate, the electrostatic force field charges the particles of both groups with different electrostatic charges so that the particles of one group will have a charge and an electrostatic force which is different from the charge and elecrtostatic force of the particles of the other group. For these purposes, the maximum possible voltage without flow of current is applied to the particles and the high frequency electrostatic force field may be either an alternating current field or a pulsating direct current field. A high frequency pulsating direct current field is preferable, in general, over the alternating current field, because the pulsating direct current field results in a higher peak voltage than the alternating current electrostatic field. While similar results can be obtained by way of a direct current electrostatic field, perhaps in combination with mechanical agitation, the use of a high frequency field shortens fabrication time and permits the use of lower working voltages.

At the same time that the particles are acted upon by the high frequency electrostatic field, a magnetic force field is applied which orients the magnetic particles. The magnetic force field is aroused by either a permanent magnet or electromagnet. It is believed that the magnetic force field and the electrostatic force field further cooperate so that the magnetic field further focuses the electrostatic force field in such a manner that the electrostatic field follows or is caused to follow the lines of force, i.e., the flux lines, aroused by the magnetic force field. Such focussing may be accomplished by appropriately shaping the polar pieces of the magnet in a manner which is similar to the methods used in the well-known cathode ray tube art. Thus, although the magnetic force field would otherwise form the particles having a magnetic moment into a contacting magnetic orientation, the electrostatic field creates an electrostatic repulsive force between the like particles of one group and between the like particles of the other group and an electrostatic attractive force between the dissimilar particles of one group and the other group. Thus, the particles of one group are caused to alternate with the particles of the other group. By balancing the power of one field to the other field, the magnetic force attracting magnetic particles is balanced by the repulsive electrostatic force between similar particles and the attractive electrostatic force between dissimilar particles. The matrix material is cured, hardened or set during the forming and orientation steps to help stabilize the position of the formed and oriented dipoles.

A third force field, obtained from radioactive material, may be applied to the particles during formation and orientation of the dipoles, especially when it is desired to utilize the properties of such radioactive materials during use of the fabricated current limiting device. The radioactive force field acts as a booster by inducing ionization of the conductive particles and by causing the formation of free electrons. In acting as a booster, the radioactive force field permits the use of lower potentials in the high frequency electrostatic field and hastens the formation of dipoles.

It is, therefore, an object of the present invention to provide a method for producing current limiting devices.

Another object is the provision of such a method for utilizing a high frequency electrostatic field and a magnetic field to form and to orient conductive particles into oriented dipoles.

Another object is to provide such a method for making current limiting devices having order-to-order transitions of oriented dipoles of conductive particles.

Another object is the provision of such a method for fabricating current limiting devices by utilizing a radioactive force field, an electrostatic force field and a magnetic force field.

Another object is to provide a method for making solid state switches.

Another object is to provide a method for fabricating heat sensitive devices or switches.

Another object is to provide a method for fabricating pressure sensitive devices or switches.

These and other objects, as well as a more complete understanding of the present invention, will become more apparent with reference to illustrative embodiments of the present invention, wherein.

Figure 3:
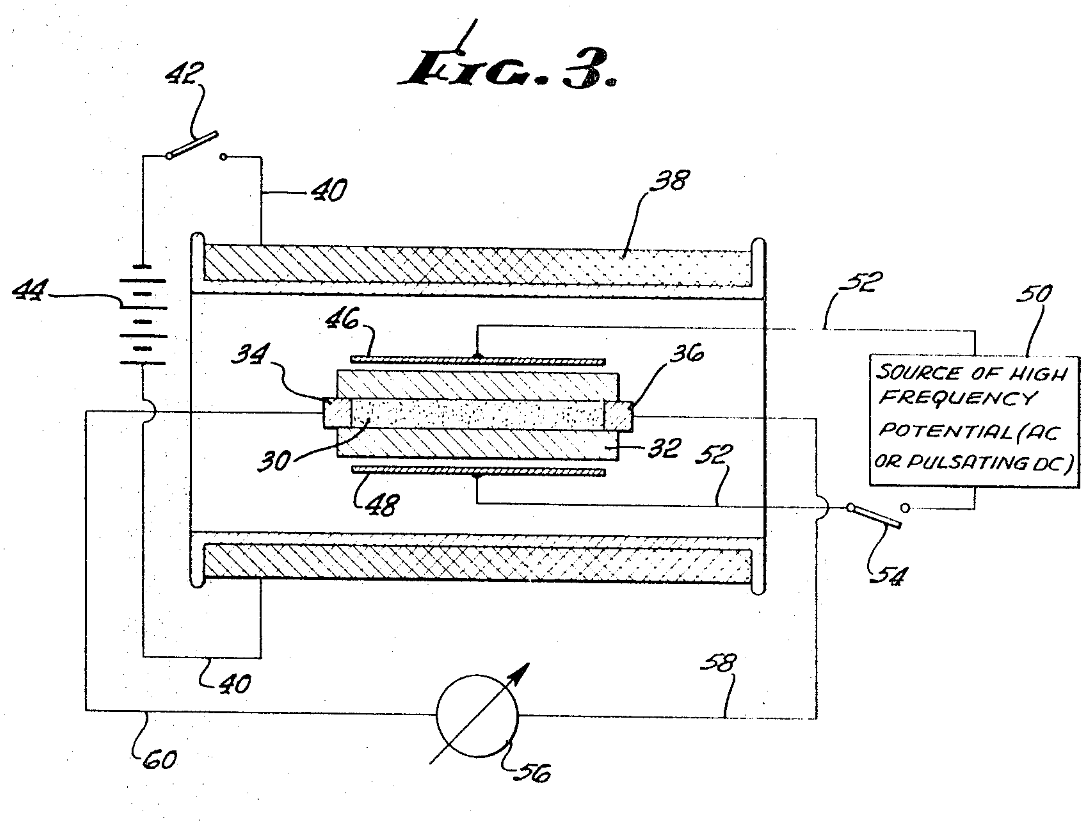
FIG. 3 is a schematic view of one apparatus for forming and orienting conductive particles in a dielectric matrix utilizing a high frequency electrostatic force field disposed 90° from a magnetic force field aroused by an electromagnet.
Figure 4:
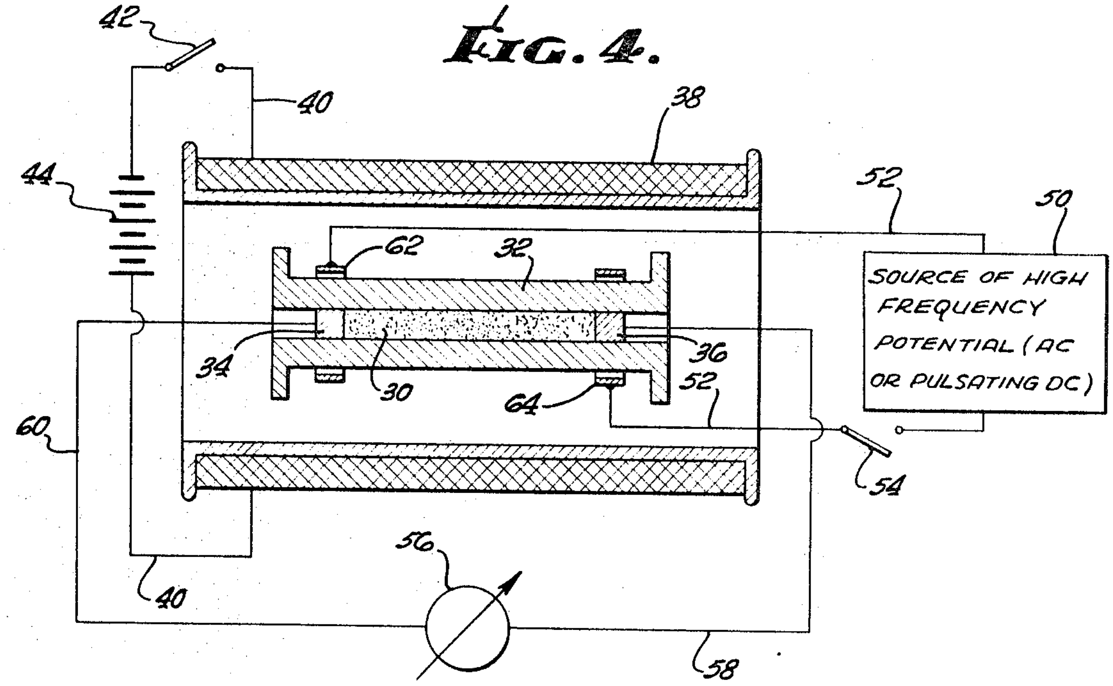
FIG. 4 is a further schematic view of another apparatus for forming and orienting conductive particles in a dielectric matrix utilizing a high frequency electrostatic force field and disposed colinearly with a magnetic force field aroused by an electromagnet.
Figure 5:
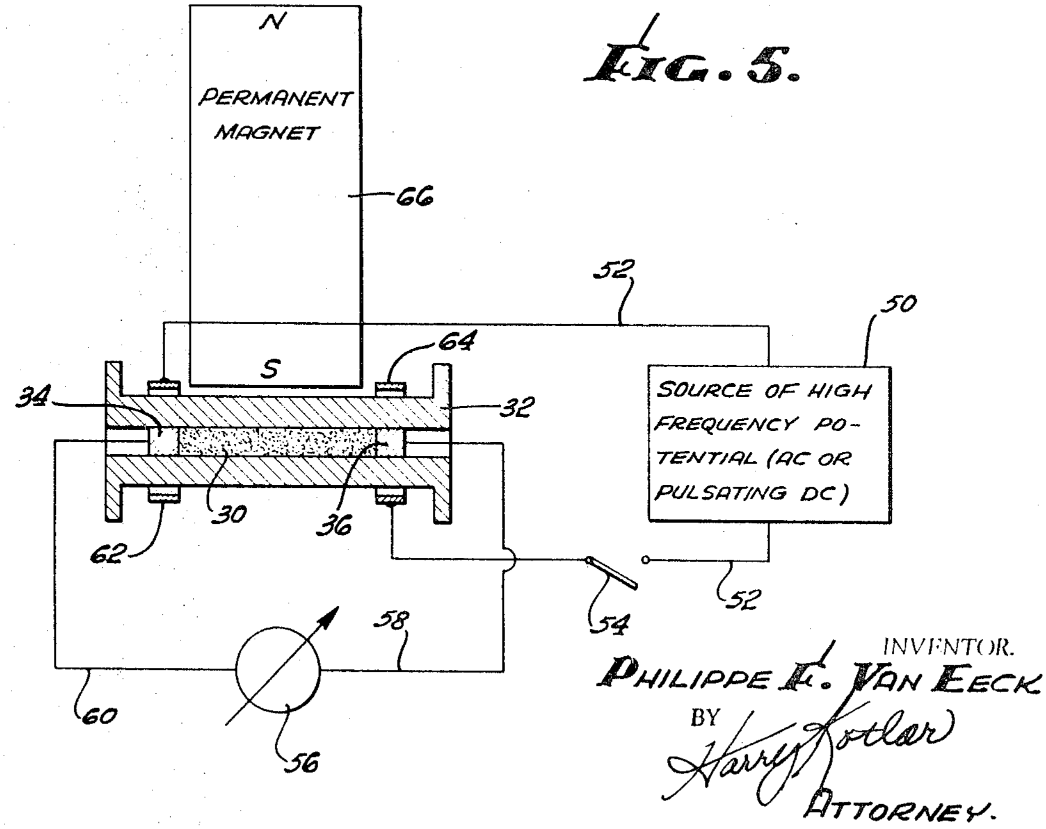
Figure 6:
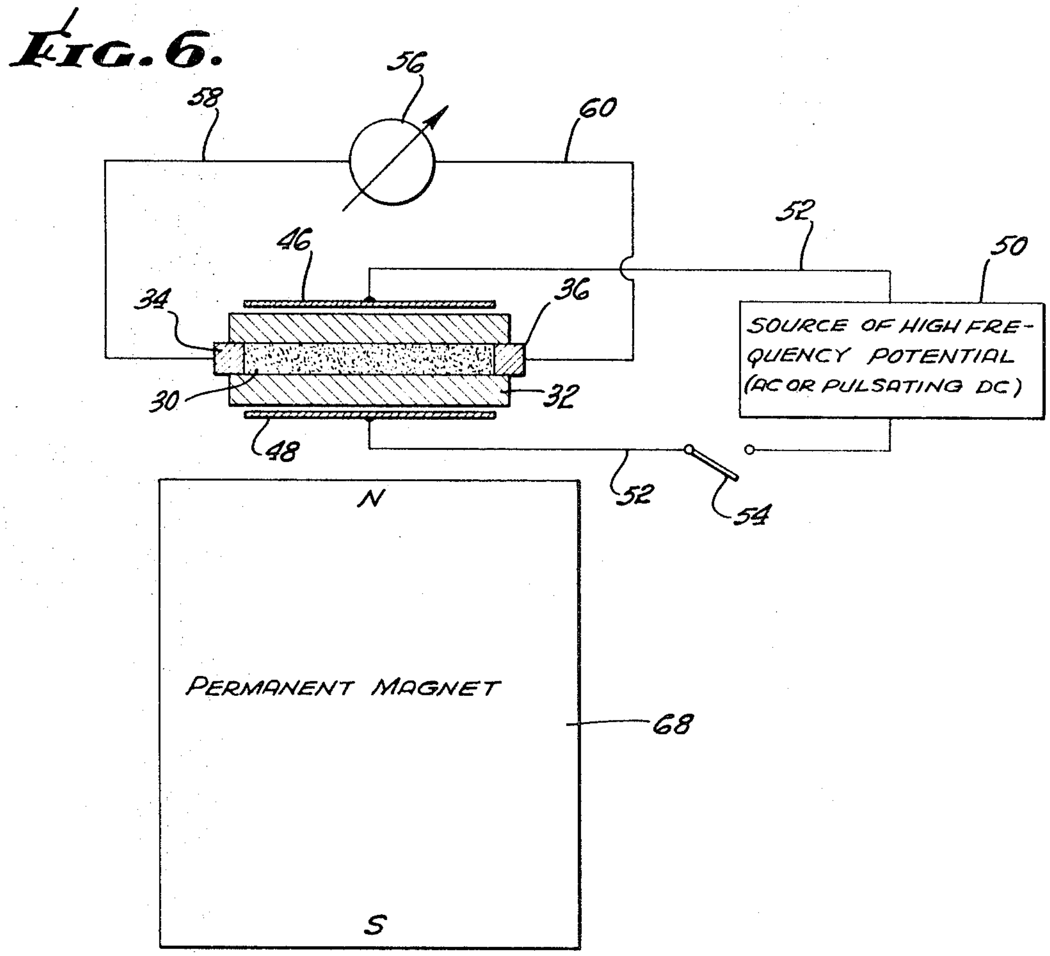
Figure 8:
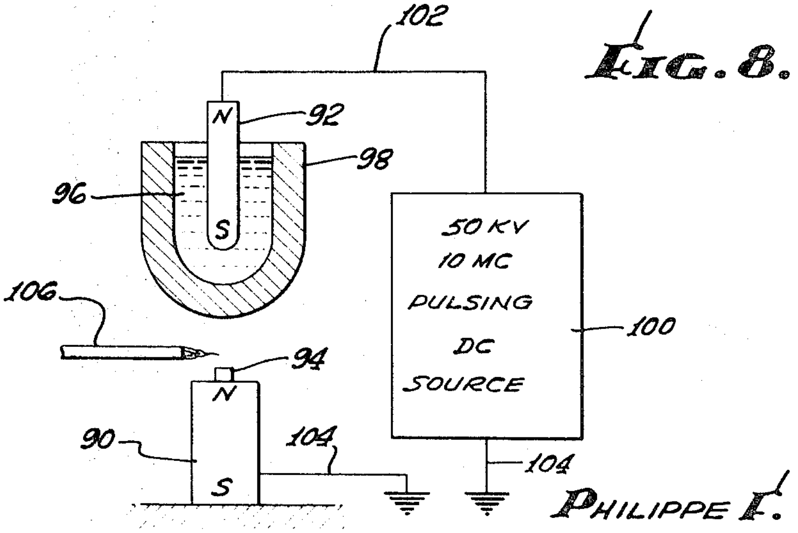
Figure 7:
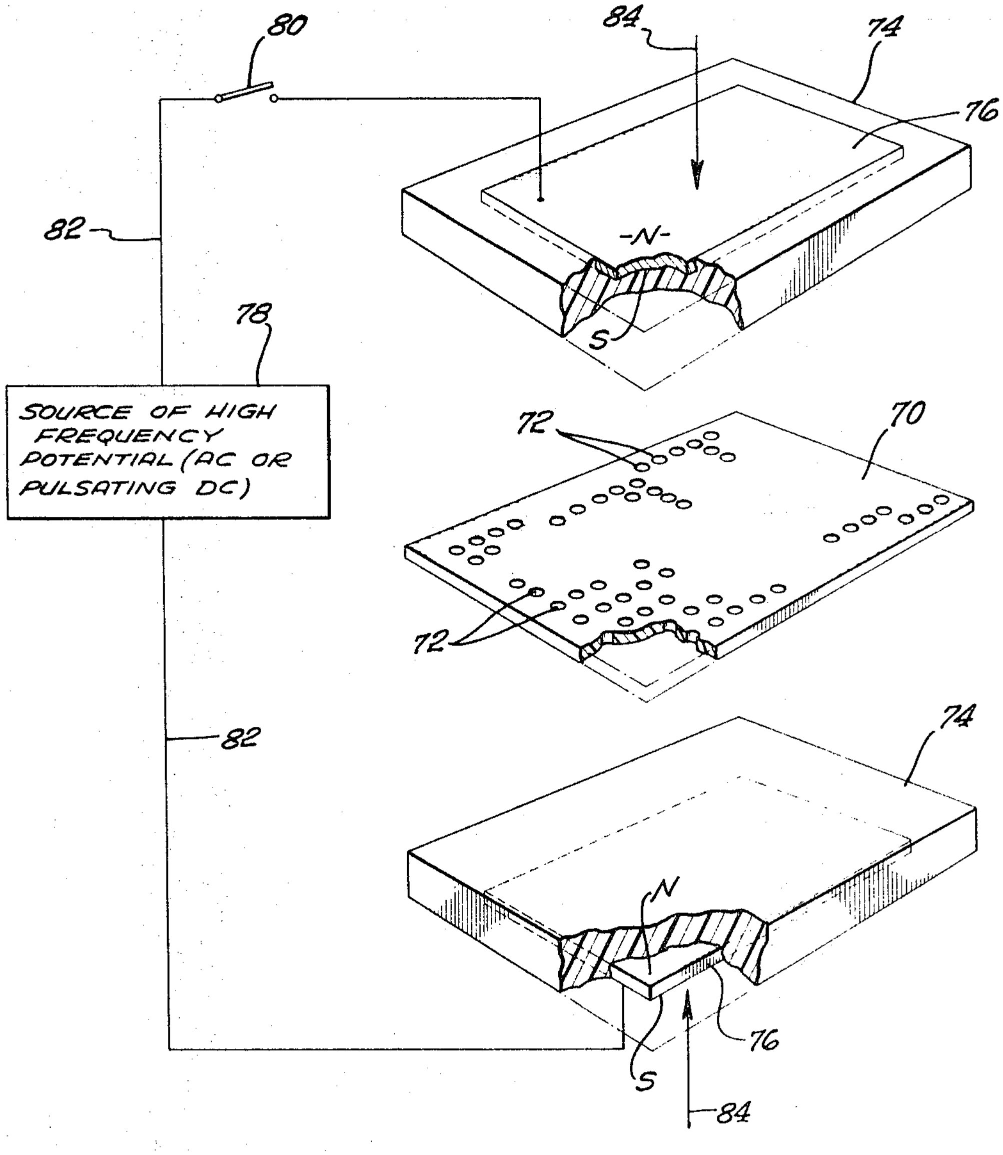

FIGS. 5 and 6 are variations, respectively, of the apparatus depicted in FIGS. 3 and 4 wherein the electromagnetic force field are replaced by permanent magnet force fields, the variations among FIGS. 3–6 being illustrative both of the interchangeability of permanent and electromagnetic force fields and of the change of directions between the magnetic force fields and the electrostatic force fields;

FIG. 7 is an exploded view of the apparatus, partly in section, illustrating a high frequency electrostatic field and a permanent magnet field for producing a plurality of current limiting devices; and FIG. 8 is a view of specific apparatus for producing a current limiting switch.

Figure 1:
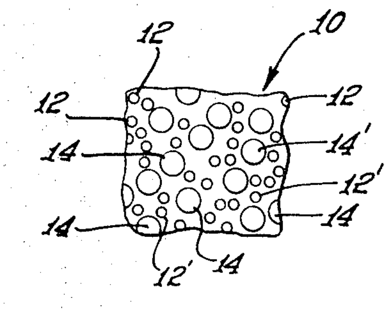
FIG. 1 is a view of a two-dimensional theoretical model of a plurality of particles before the formation and orientation of dipoles.
Figure 2:
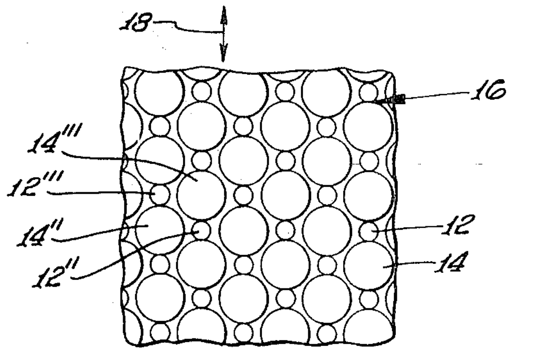
FIG. 2 is a view of a two-dimensional theoretical model of a plurality of oriented dipoles formed under double orientation by means of electrostatic and magnetic fields.

Accordingly, with respect to FIGS. 1 and 2, a theoretical model of a typical current limiting device is depicted as two-dimensional; however, it is to be understood that the following discussion is appropriate to three-dimensional theoretical models. In addition, the following discussion is directed toward a simplified understanding of the interaction between conductive particles at the domain level and, as set forth, the discussion is an attempt to explain a present theory of such current limiting devices, which discussion is based upon current theoretical hypotheses. Therefore, future investigations, experimentation and data may indicate a revision of the following explanation. Regardless, however, of the explanation regarding the theoretical model depicted in FIGS. 1 and 2, the apparatus depicted in FIGS. 3–8 is illustrative of the mechanisms by which the present invention may be carried out.

FIG. 1 depicts a cross-section of a mixture of conductive particles in an uncured or unset dielectric matrix material. One group 12 of conductive particles is illustrated as small circles and represents that group which is selected from the group of elements of the Periodic Table having an even number of electrons in its outer shell and having a magnetic moment. A second group 14 of conductive particles is illustrated as the larger circles and the second group is selected from the group of elements of the Periodic Table having an odd number of electrons in its outer shell. It is to be understood that the relative sizes of the circles which represent the two groups are not to be interpreted as the respective atomic weights or particle size, or the like. The sizes of the respective circles are only used to differentiate ebtween the two groups of particles. Groups 12 and 14 are selected in such a manner that the formed and oriented finished device is provided with a specific conductivity. This conductivity is predicated upon the particular two elements which constitute the two groups, the percent inclusion of one group of particles to the other group of particles, the material of the dielectric matrix and the geometry of the device. For example, a combination of 98% cobalt and 2% silver in a glass matrix provides a resistance of 5 ohms while a higher percentage of silver and a smaller percentage of cobalt provides a resistance which is less than 5 ohms.

The two groups of conductive particles are formed into dipoles and the dipoles are oriented with respect to each other as shown in FIG. 2. In order to form dipoles or electrets, the individual particles comprising both groups must be simultaneously operated upon by a magnetic field and a high frequency time-varying electrostatic field of periodic or pulse waveform. The electrostatic field may be aided by the inclusion of a small percentage of radioactive material which ionizes the conductive particles and creates an excess of free electrons so that the association of one particle from one group with another particle of the other group will be more easily facilitated than if the electrostatic field acted alone. The conductive particles, for example, the particles of group 12, having a magnetic moment and an even outer orbit of electrons are formed into contacting paths along the magnetic flux lines of force by the magnetic force field. The electrostatic field, as focused by the magnetic force lines, produces electrostatic force charges in all conductive particles of groups 12 and 14. Since one group 12 of particles has an atomic mass which is different from the atomic mass of the other group 14 of particles, the first group 12 takes on an electrostatic charge which is different from that of the other group 14 of particles. Conventionally, this difference of electrostatic charge is thought of as plus and minus charges; however, it is as valid to consider the difference of electrostatic charge in terms of a potential drop. Because all the particles of one group have the same charge, for example, the particles of group 12 possessing a magnetic moment, the magnetic contact between these particles is broken to form spaces therebetween by means of an electrostatic repulsion force, although these particles are still oriented in non-contacting disposition by the magnetic force field. The particles of group 14 not possessing a magnetic moment are similarly electrostatically repulsed from each other; but, because of the difference of electrostatic charge between the two groups of particles, the group 14 particles not possessing a magnetic moment are attracted to the group 12 particles having a magnetic moment. In addition, because the electrostatic field is focused by the magnetic force field, the particles not possessing the magnetic moment fill the spaces between the particles having a magnetic moment and the two groups of particles form conductive chains which follow the magnetic lines of force, as illustrated in FIG. 2. It is further believed that the two groups of particles form electronic couplings as, for example, by some mechanism of electron sharing. Thus, according to a modified theory, the oriented dipoles of FIG. 2 may also contact in an alternating particle manner in two or more directions rather than in one direction in contrast to the FIG. 2 representation.

In order to properly form such conductive chains, the electrostatic force field and the magnetic force field must be balanced so that the electrostatic field does not create too great a repulsive force between the particles of each group or so that the force of the magnetic force field does not cause the particles having a magnetic moment to cling too strongly together. Thus, the power of the magnetic force field must be as nearly equal to the power of the electrostatic force field.

One method of obtaining the proper balancing of the electrostatic and magnetic fields may be effected by experimentation for each two specific groups of particles in a dielectric matrix. For a particular device having a specific power rating, resistance and switching characteristic (i.e., trip current), three or four test devices are made by means of the present invention from the two groups of particles using different ratios of the two groups. Upon completion of the process, the devices are tested to obtain three or four points which are plotted on an "on resistance" and "percent conductive particle" graph. From these points a curve for a device comprising the two particles may be obtained and any point on the curve is also a particular value of trip current.

Once the specific percentages of conductive particles to obtain the above device parameters are known, a series of further devices are made for a particular percentage but using different values of magnetic field strength or electrostatic field strength. These several formed devices are tested to obtain the number of times they can be reset, that is, made conductive and non-conductive. It has been found that a low number of resets indicates a poor dipole formation and orientation and that a high number of resets indicates a good dipole formation and orientation. The values of electrostatic field and magnetic field strengths are plotted on a curve which, when extrapolated, give the best combination of electrostatic field strength to magnetic field strength. In general, the electrostatic field is held constant and the electromagnetic field strength is varied because the latter field has a greater latitude of variability than the former field. However, the magnetic field may be held constant, as for a permanent magnet, and the electrostatic field can be varied. Once the proper balance for the fields is known for a specific ratio of particles, this balance may be applied to all ratios of the same particles.

The particles thus form into dipoles which assume the orientation depicted in FIG. 2 wherein each dipole 16, comprising a particle of group 12 and a particle of group 14, arranged in a head to tail manner. In addition, each particle of group 12 is adjacent to a particle of group 14. The order of the orientation is, therefore, shown by a double-headed arrow 18. At the same time that both the electrostatic field and the magnetic field are exerted upon the conductive particles, the matrix material is hardened or set.

The order of orientation may have any disposition and may be effected by the specific direction of the electromagnetic or permanent magnetic force field. However, the defference between the orders of orientation may also be used to explain how a switch, for example, may be transformed from its conductive order to its nonconductive order. FIG. 2, for example, may illustrate the conductive order of the oriented dipoles in a switch. When an overload of current flows through the switch of FIG. 2, the dipoles undergo an order transition such that the orientation or polarization is no longer the same as that shown in FIG. 2.

It is to be further understood that the order-to-order transition is also theoretical and that the original orientation of the dipoles of FIG. 2 is also theoretical. It is possible, for example, that the simultaneous application of an electrostatic force field and a magnetic force field will cause the formation of dipoles or elecrets only in the direction of the magnetic force field, that is to say, if the order of orientation as shown in FIG 2 were to be obtained, a particle 12' of FIG. 1 would form a dipole with a particle 14' rather than, for example, some other particle of group 14. Furthermore, the order transition from FIG. 2 to some other order may not comprise a rotation of dipoles but an electronic disassociation of one dipole pairing to another dipole pairing. Thus, with reference to FIG. 2, the dipole comprising particle 12''' and 14'' may break apart and form dipoles with surrounding broken dipoles in such a manner that new dipoles comprising 12'' and 14'' and dipoles comprising 14''' and 12''' are formed.

Such current limiting devices may be obtained by use of the apparatus shown in FIGS. 3–8. In all cases, the mixture of conductive particles during the set of the dielectric matrix material are exposed to a high frequency alternating current or pulsating direct current electrostatic force field and a second force field effected by an electromagnet or a permanent magnet. A further force field obtained from radioactive material may be obtained by the inclusion of such radioactive material within the mixture of conductive particles and matrix material. The fields form the conductive particles into a plurality of dipoles and orient the dipoles. At the same time, the matrix material is set to stabilize the desired orientation of the particles. One of the fields applied is always an electrostatic force field. Another force field, the magnetic field, may be produced by either a permanent magnet or an electromagnet. Since the formed dipoles possess magnetic and electrostatic moments, the magnetic and the electrostatic fields are able to orient the dipoles in an ordered manner. It has been found that, for the process to occur and for the product to be formed in an efficient manner, it is necessary that the frequency of the electrostatic field be at a level existing in the range of over 10 kilocycles, and frequently greater than several megacycles. The particular frequency will be determined, in part, by the particular process in question, the chemical and atomic composition of the particles, the grain size of the particles, and the maximum possible voltage level of the field.

The invention is useful to obtain an orientation of conductive particles so that they form dipoles and are ordered in a particular manner. With one ordered orientation of dipoles, the device will have a specific conductance. With another ordered orientation, the device will act as a capacitor. It may be desired in certain applications to combine both purposes in the same product so as to obtain a combination of conductors and capacitors. This multiple purpose may be effected by providing different ohmic paths through the device, which paths are electrically dependent or independent, as desired.

These principles may be employed to produce a resettable solid-state switch. The switch is produced in a manner similar to that described above. Particles of conductive material, selected from two groups of elements according to the previously described criteria, are mixed with an uncured plastic, unset ceramic, etc. The particles are subjected to both a magnetic field and a high frequency electrostatic field while the plastic is being cured. The device is then suitable for use as a switch and is connected into the desired electronic circuit.

It the circuit begins to experience an overload, the current through the switch will rise. As the current rises, the electronic order of orientation of the dipoles is affected until, at the overload point, the order transits into another order and the current is cut off to prevent damage to any of the current components. It is theorized that the overload current sets off an avalanche effect such that, as some dipoles transit to the other order, the overload current creates a greater overload on the remaining dipoles. After the cause of the overload is remedied, the switch may be reset. In the case of a 1 watt switch, to make the switch reconductive, a small high voltage pulse of the same wattage is applied to the switch. This pulse reorients or reorders the dipoles and the switch is reset. The voltage pulse, for this purpose, may be aroused by either a direct or alternating current source of power.

In some cases, it is not practicable to include a voltage generating apparatus which will deliver one watt of power because of space, weight or other conditions. Therefore, it is sometimes desirable to provide the switch with automatic self-resetting means. The automatic operation may be accomplished by adding sufficient amounts of a radioactive material or oxide or other such compound of such an element as thorium, uranium, cobalt, or polonium to the switch while it is being manufactured. The manufacturing may be accomplished by the inventive process wherein radioactive particles are combined with the various switch particles and thoroughly mixed therewith. It is theorized that the radioactive material produces sufficient internal ionization to aid the reordering of the orientation in a manner similar to that effected by the high frequency electrostatic field in order to reset the switch to its original conductive condition.

It has been found that as little as 1% inclusion of a radioactive oxide into a switch will provide sufficient ionization so that the voltage can be reduced for the same wattage. Such a system is useful where the resetting of the switch is not completely automatic but conrollable by some operator.

It may be necessary, however, to provide a completely automatic resetting system. For example, a space vehicle may pass through a highly radioactive belt or a field apparatus in a remote location might be struck by lightning, which, in either case, would overload the circuit temporarily. It would be impracticable, if not impossible, to provide an attendant to reset the switch whenever necessary. Consequently, by increasing the percentage of radioactive material, for example, thorium oxide, to approximately 25%, the external source of power may be eliminated to render the switch self-resetting.

When the product desired to be made comprises a conductive squib or explosive device, such as is used to ignite a propellant ignitor filament, for example, the ingredients are placed together in the desired proporations. Gunpowder, for example, comprises the combination of carbon, sulphur and potassium nitrate. These ingredients are generally purchased in mixed condition from a supplier and are combined with iron and magnesium, antimony sulfide, barium dioxide or aluminum to adjust or to preset the temperature at which the mixture will explode as well as to set the specific value of conductance. The combination is placed within a mold with an uncured plastic under pressure to form pellets, which are conductive and which may be easily ignited by an electric current.

A high frequency electrostatic field and a magnetic field are applied while the plastic is cured or polymerized to form a solid article to stabilize the orientation of the formed and oriented dipoles. The use of a plastic matrix also provides further advantages, not only by supporting the ingredients in their oriented positions but also by protecting the particles from atmospheric conditions.

Such a squib is a solid state switch of the general type described herein with the addition of an explosive feature. It is fabricated in its nonconductive state having a relatively high impedance. In this high impedance state, the squib cannot be ignited. However, upon application of a current limited, high voltage pulse to the squib, as described above, the squib becomes conductive. Upon further application of a subsequent current pulse, the squib ignites and explodes.

The use of such an oriented conductive dipole squib device affords several advantages. Since the conductive particles are oriented in a matrix, there is little likelihood of damage to the device by vibration or shock. Its initial impedance is extremely high, in the range of 300,000 ohms, to assure its nonconductivity before a voltage pulse places the switch into its conductive state. Consequently, any premature current leakage cannot occur and effect explosion. Furthermore, a low voltage discharge, such as static electricity, would not affect the device. In addition, by changing the additives or composition, the potential level at which the explosion occurs may be varied to a large extent in contradistinction to conventional products. While prior art products may cause an ignition temperature in the vicinity of 500° C., the oriented squibs fabricated by means of the present invention can produce an ignition temperature in excess of 1000° C.

The addition of certain materials, radioactive oxides, for example, further allows the potential supplied to the squib to be decreased by more than one-half since internal ionization aids the orientation. Such additives increase reliability even further since there is a smaller chance of internal sparking and internal damage when a lower potential is supplied.

Although the above discussion relates to the use of plastics or ceramics in its general sense, it is not necessary that the invention be restricted to any specific plastic since it is primarily a supporting means. Consequently, matrices of silicone, epoxy resin, ceramic, or any other suitable nonconductive material may be used.

Referring to FIG. 3, a mixture 30 of uncured plastic, such as a polyester resin, an epoxy resin, a phenolic resin and acetate, catalyst and conductive particles, is disposed in an insulating mold 32. A pair of electrodes 34 and 36 are positioned at each end of the mold to hold the mixture therein. A winding 38 is disposed about the mixture and is connected by leads 40 and a switch 42 to a source 44 of direct current. Consequently, when switch 42 is closed, a direct current electromagnetic field will arise whose axis will pass longitudinally through the axis of the mixture and the mold. A pair of plates 46 and 48 are disposed on opposite sides of the mold, not in ohmic contact with the mixture, and are secured to a source of high frequency potential 50 through leads 52. Source 50 arouses a high frequency alternating current or a pulsating direct current electrostatic field when a switch 54 in one lead 52 is closed. When the connection is made to the source, a high frequency electrostatic field arises between plates 46 and 48 and is disposed in a direction which is 90° offset from the axis of the direct current electromagnetic field. An ohmmeter or other control instrument 56 is secured by leads 58 and 60, respectively, to electrodes 34 and 36 so that the process of orientation may be viewed.

EXAMPLE I

The apparatus of FIG. 3 may be used to produce a bar which can be used to convert or to translate ultrasonic waves into a variable current without external amplification.

Mixture 30 may comprise particles of pure nickel powder and aluminum powder, both types of particles being of a size of five micron or less and being mixed with micro-crystalline particles of silicon and with a matrix material of uncured plastic and the catalyst. The silicon particles are used so that the device may additionally exhibit piezoelectric characteristics.

The electromagnetic field is given a field strength of 10,000 gauss per square centimeter of field while the electrostatic field has a voltage of 20,000 volts or more (depending on the number of bars) at 3 watts/cm./cm.$^2$ of bar, at a frequency of 500 kilocycles. While the plastic is being polymerized and the particles are being oriented, ohmmeter 56 is indicating the progress of the orientation in order to afford a control over the process.

With reference to FIG. 4, all the elements thereof are the same as in FIG. 3 with the exception that plates 46 and 48 are disposed as rings 62 and 64. The electrostatic field, consequently, will have a direction which is coaxial with the axis of the electromagnetic field; therefore, their angular disposition will be 0°.

EXAMPLE II

This arrangment may be used for the preparation of a product which is sensitive to very light pressures and suitable, for example, for measuring barometric pressure variations or arterial pulses and blood pressure.

Here, mixture 30 comprises two types of particles comprising aluminum and iron powder, both mixed with a matrix material of silicon rubber provided with a foam producing substance and its catalyst.

Using an electromagnetic field strength of 10,000 gauss per square centimeter and an electrostatic field strength of 50,000 volts at 3 watts/cm./cm.$^2$ and at a frequency of 70 kilocycles (the grain size being five micron or less), the product is formed while the progress of the orientation is checked by means of ohmmeter 56 and while the plastic is being cured and foamed.

FIGS. 5 and 6 are variations of FIGS. 3 and 4 wherein the electromagnets are replaced by permanent magnets 66 and 68 in order to depict the interchangeability of the magnetic force fields. The choice is one of force needed and the electromagnetic force fields are preferred when a high or a concentrated magnetic force is required.

FIG. 7 depicts an exploded arrangement whereby a plurality of oriented plastic articles may be produced by means of an alternating current or pulsating direct current high frequency electrostatic field. A nonconductive forming plate 70, into which a plurality of cylindrical holes 72 are formed, is sandwiched between a pair of supporting plates 74. A pair of condenser plates 76, which also are permanent magnets, are disposed within plates 74 and are connected to a source 78 of high frequency potential through a switch 80 and wires 82. The permanent magnet condenser plates apply a magnetic force field in the same direction as the electrostatic field. The pressure, indicated by arrows 84, may be applied while the conductive particles are being oriented and the uncured matrix material and catalyst are coacting.

The apparatus of FIG. 7 is useful when a plurality of oriented articles are to be made and the fields comprise a high frequency electrostatic alternating current force field and a permanent magnet force field arranged to operate along the same axis. It is to be understood that an electromagnetic force field is also applicable instead of the permanent magnet force field in the FIG. 7 process, and the apparatus may be used to form resettable switches and squib devices.

EXAMPLE III

A 200 milliwatt resettable switch having a resistance of 5 ohms and a trip current of 200 milliamperes was prepared by means of the present invention. An unhardened matrix material was prepared from silicon dioxide, sodium fluoride, and calcium fluoride of respective percentages 70%, 15% and 15%. These matrix materials were thoroughly mixed. The two groups of particles comprised cobalt and silver of respective percentages of 98% and 2%. To the mixture of particles was added 1% radioactive thorium oxide to 99% of the mixture of cobalt and silver. This mixture was thoroughly combined in a turning barrel. Twenty-five percent of the cobalt-silver-thorium oxide mixture was combined with 75% of the matrix material and the two were thoroughly combined in a turning barrel.

The total mixture was then mechanically compressed into the desired form of the finished switch, which in this example was configured as a disc having a diameter of 5 millimeters and a thickness of 1.5 millimeters, thereby effecting a switch having a maximum heat dissipation surface of 5 mw./mm.$^2$. For a 10 ampere current limiting switch formed from 50% ceramic matrix and 50% cobalt-silver mixture of a 98%-2% respective ratio, the switch had a diameter of 20 millimeters and a thickness of 1.5 millimeters to provide a power rating of 10 watts and a heat dissipation of 5 mw./mm.$^2$ of surface. It is to be understood that other sizes and other parameters are possible, as suggested in the following table:

| Percent | | | |
|---|---|---|---|
| Conductive particles [1] | Matrix ceramic | Power rating (amperes) | Resistance (ohms) |
| 25 | 75 | 0.2 | 5 |
| 30 | 70 | 0.4 | 2.5 |
| 40 | 60 | 1 | 1 |
| 60 | 40 | 4 | 0.25 |

[1] 98% cobalt—2% silver.

NOTE.—When aluminum replaced silver, the power rating and resistance changed slightly since aluminum is less conductive than silver.

The apparatus depicted in FIG. 8 was utilized to produce the current limiting switch. A pair of permanent magnets 90 and 92 were arranged so that the north pole of one was positioned proximate to the south pole of the other. Magnet 90 was used to support a compressed tablet 94 formed from the above materials. Magnet 92 was placed in an insulating oil bath 96 within a quartz receptacle 98. In addition, magnets 90 and 92 were utilized as electrodes for a pulsating direct current electrostatic source 100 which was connected to magnetic electrodes 90 and 92 by leads 102 and 104. A torch 106 was arranged adjacent to tablet 94 in readiness to bake or fuse the dielectric matrix material of the tablet.

The tablet was then placed on magnet 90 and the pair of insulated and magnetic electrodes 90 and 92 were placed above and below the tablet. A 50 kilovolt pulsing direct current pulse at 10 megacycles was provided between the electrodes. The permanent magnet had a field force of 1500 gauss per square centimeter. After the pulsing direct current and magnet fields were established, the tablets were heated by torch 106 to cause a baking or fusing of the matrix material to bond it. In another experiment, an electromagnet replaced the permanent magnets.

When no radioactive thorium oxide was placed in the mixture of cobalt and silver, it was found that a higher value of pulsing direct current had to be used to obtain a similar formation of dipoles. In addition, the value of current in order to turn off the switch and the value of voltage to turn on the switch were also changed.

In another experiment similar to that described in Example III, the matrix comprised a plastic rather than a glass ceramic, and the heat dissipation was 2 mw./mm.$^2$ of surface. Here, 5% of a 98% cobalt-2% silver mixture and 95% plastic matrix provided a 50 mw. switch having a switching characteristic of 50 ma. and a resistance of 20 ohms at 20° C. When the temperature was raised to 100° C., the resistance rose to 40 ohms and the trip current was 25 ma.

Other combinations of conductive particles selected from the two groups are possible and other dielectric matrix material may also be used so that a wide variety of current limiters and other devices may be obtained. The use of particular conductive particles and their relative percent inclusion to each other and to the matrix material are the primary means by which the different devices having different purposes are produced. The conductivity of a current limiter may be increased by raising the percentage of conductive particles to that of the matrix material and/or by increasing or utilizing a group of particles which has a high value of conductivity, the final result being dependent also upon the desired power rating of the device. Thus, for a low power current limiter, a relatively low percentage of conductive particles to dielectric material is used. Conversely, a larger percentage of conductive particles of both groups is used for a high power device and also for current limiters of large size. In such high power devices, silver and copper preferably are also utilized so that heat dissipation will be lowered by decreasing the device's internal resistance. Because the extreme range and variation of current limiters having different results is dependent primarily upon the above factors, it is impossible to list every such variation. However, further examples of such current limiters may be set forth by listing the several elements used to comprise the two groups, although it is to be understood that this listing is illustrative. The group of particles having an even number of outer orbit electrons and a magnetic moment includes iron, cobalt and nickel. The other group of particles having an odd number of electrons in its outer orbit includes silver, aluminum, copper, platinum, gold, cesium, palladium, rubidium and ruthenium. For example, 5% cobalt and 20% copper may be mixed with a 75% glass matrix and exposed to an electrostatic field of 50 kv. at 500 kc. and a magnetic field of 1000 to 2000 gauss (depending upon the size of the device) to obtain a current limiter having a resistance of 0.5 ohm and a trip current of 5 amps. These and other constituents may be mixed in any order and with varying percentages to produce a current limiter or other device having the desired results.

For all devices made by the process of the present invention, in order to make them applicable for use in electronic circuitry, each device was coated on two surfaces, preferably by a vacuum deposition process, with a conductive metal which was inert with respect to the matrix material and which could be deposited at a temperature which would not affect the device. Preferably, aluminum and gold is used for ceramic matrices while cadmium is used for plastic matrices.

Although the invention has been described with reference to particular embodiments thereof, it should be realized that various changes and modifications may be made therein without departing from the spirit and scope of the invention.

What is claimed is:

1. A method for fabricating a solid state device comprising the steps of preparing a mixture from an unset dielectric material and two groups of conductive particles consisting of two elements selected from the Periodic Table of Elements, one of the groups having an odd number of electrons in its outer shell and the other of the groups having an even number of electrons in its outer shell and having a magnetic moment;

simultaneously applying an electrostatic field and a magnetic field to the mixture to form and to orient a plurality of dipoles, each of the dipoles comprising a combination of the two elements; and setting the dielectric material during the step of applying the fields to effect a retaining matrix for the formed and oriented dipoles.

2. A method as in claim 1 further including the step of forming the magnetic field and the electrostatic field in predetermined relationship to each other and to the mixture of the two groups of conductive particles.

3. A method as in claim 1 further including the step of providing the electrostatic field with frequencies which are attuned to the natural frequencies and harmonics of the two groups of particles.

4. A method as in claim 1 further including the step of selecting the frequency of the electrostatic field to correspond to the physical characteristics of the two groups of particles.

5. A method as in claim 1 further including the step of adding radioactive material to the mixture to effect a third field and to aid the formation of the dipoles.

6. A method as in claim 1 wherein the electrostatic field is of alternating current.

7. A method as in claim 1 wherein the electrostatic field is of pulsing direct current.

8. A method as in claim 1 further including the addition of explosive particles to form a squib.

9. A method as in claim 1 wherein the dielectric material is heat sensitive to form a temperature sensitive switch.

10. A method as in claim 1 wherein the dielectric material has a coefficient of thermal expansion correlated to the coefficient of thermal expansion of the conductive particles to form a temperature related device.

11. A method as in claim 10 wherein the coefficient of thermal expansion of the dielectric material is less than that of the conductive particles to form a thermally negative resistance device.

12. A method as in claim 10 wherein the coefficient of thermal expansion of the dielectric material is greater than that of the conductive particles to form a thermally positive resistance device.

13. A method as in claim 10 wherein the coefficient of thermal expansion of the dielectric material is equal to that of the conductive particles to form a device having a stable resistance upon a change in temperature.

14. A method as in claim 10 wherein the dielectric material is selected from a group consisting of substances which have a low coefficient of thermal expansion producing a device having a negative temperature coefficient of resistance.

15. A method as in claim 10 wherein the dielectric material is selected from groups consisting of substances which have a low coefficient of thermal expansion and substances having a positive temperature coefficient of resistance.

16. A method as in claim 15 wherein the positive temperature coefficient of resistance material is selected from the group of materials consisting of aluminum oxide and silicon carbide.

17. A method as in claim 1 wherein the dielectric material is deformable to form a pressure sensitive device.

18. A method as in claim 5 further including the step of adding radioactive material in a ratio to the two groups of conductive particles of at least 25% to form automatically resettable switches.

19. A method as in claim 1 further including the step of selecting the ratio of one of the conductive particles to the other of the conductive particles to impart a specified conductivity to the device.

20. A method for fabricating a solid state switch comprising the steps of selecting a first group of conductive particles consisting of the elements of the Periodic Table having a magnetic moment and having an even number of electrons in their outer shells, selecting a second group of conductive particles consisting of the elements of the Periodic Table having an odd number of electrons in their outer shells, forming a mixture of specified percentages of the first and second groups with an unset dielectric material and exerting electrostatic and magnetic forces on the mixture while setting the dielectric material.

21. A method as in claim 20 wherein the particles of the first group are selected from the elements consisting of iron, cobalt and nickel.

22. A method as in claim 20 wherein the particles of the second group are selected from the elements consisting of aluminum, cesium, copper, gold, palladium, rubidium, ruthenium and silver.

23. A method for fabricating a solid state device comprising the steps of preparing a mixture containing unset dielectric material, a first element in particulate form selected from a first group consisting of those elements having an even number of outer orbit electrons and having a magnetic moment, and a second element in particulate form selected from a second group consisting of the elements having an odd number of outer orbit electrons;

subjecting the combined mixture to a time-varying electric field of periodic waveform and a simultaneously applied static magnetic field to form the elements into oriented electrets comprising one of each of the two groups of elements and to form the oriented electrets into a predetermined ordered state in electrically conductive relationship; and setting the dielectric material subsequent to formation and orientation of the electrets and concurrently with the application of the electric and magnetic fields to form a retaining matrix for the electrets.

24. A method as in claim 23 further including the step of forming the magnetic field and the electric field in predetermined relationship to each other and to the mixture of the two groups of conductive particles.

25. A method as in claim 23 which further includes the steps of fabricating a series of solid state devices from the selected mixture of dielectric material and first and second elements utilizing differently related electric and magnetic fields for each such device in the series, testing the devices thus fabricated for the number of times the devices can be successfully made conductive and non-conductive and selecting that relationship of electric and magnetic fields producing a device having optimum characteristics for fabrication of subsequent solid state devices from a mixture comprising the selected dielectric material and first and second elements.

26. A method for fabricating a solid state device comprising the steps of preparing a mixture containing unset dielectric material, a first element in particulate form selected from a first group consisting of the elements having an even number of outer orbit electrons and having a magnetic moment, and a second element in particulate form selected from a second group consisting of the elements having an odd number of outer orbit electrons;

causing the first group of elements to become magnetically oriented, and causing the two groups of elements to become electrostatically charged to form the elements into oriented dipoles comprising one of each of the two groups of elements and to form the oriented dipoles into a predetermined ordered state in electrically conductive relationship; and setting the dielectric material subsequent to formation and orientation of the dipoles while continuing the step of causing the magnetic orientation of the first group of elements and causing the electrostatic charging of the two groups of elements.

27. A method as in claim 26 wherein the magnetic orientation step is caused by subjecting the first group of elements to a magnetic field.

28. A method as in claim 26 wherein the electrostatic charging step is caused by subjecting the two groups of elements to a time-varying electric field of periodic waveform.

29. A method as in claim 28 wherein the electrostatic charging step is further caused by subjecting the two groups of elements to a means for creating an excess of free electrons.

30. A method for fabricating a solid state current limiting device comprising the steps of preparing a mixture containing unset dielectric material; at least one element in particulate form selected from a first group consisting of nickel, iron and cobalt; and at least one element in particulate form selected from a second group consisting of aluminum, cesium, copper, gold, palladium, platinum, rubidium, ruthenium and silver; said particulate elements being electrically conductive and having a maximum particle size of the order of 5 microns and mixed in the ratio of 98 parts of the element from said first group to 2 parts of the element from said second group, said dielectric material and combined elements being combined in the ratio of 75 parts dielectric to 25 parts of combined elements, subjecting the combined mixture to a time-varying electric field of periodic waveform with a peak magnitude of 50 kilovolts at 3 watts/cm./cm.$^2$ and a simultaneously applied static magnetic field of 1500 gauss/cm.$^2$ intensity to form the elements into electric dipoles comprising one of each of said two groups of elements and orienting the formed dipoles into a predetermined ordered state in electrically conductive relationship, and setting the dielectric material subsequent to formation and orientation of the dipoles and concurrently with the application of the electric and magnetic fields to form a retaining matrix for the dipoles.

31. A method as in claim 30 further including the step of adding 1 part of thorium oxide to 99 parts of combined elements before the step of combining the combined elements with the dielectric.

References Cited

UNITED STATES PATENTS 1,835,267 12/1931 Bradley ------------ 338—331

CARL D. QUARFORTH, Primary Examiner

S. HELLMAN, Assistant Examiner

U.S. Cl. X.R.

264—22, 24; 335—7

PO-1050
(5/69)

UNITED STATES PATENT OFFICE
CERTIFICATE OF CORRECTION

Patent No. 3,586,743 Dated June 22, 1971

Inventor(s) Philippe F. Van Eeck

It is certified that error appears in the above-identified patent and that said Letters Patent are hereby corrected as shown below:

Page 3, line 42, after "negative", insert -- temperature coefficient of --.

Page 9, line 34, change "conrollable" to -- controllable --.

Signed and sealed this 9th day of November 1971.

(SEAL)
Attest:

EDWARD M.FLETCHER,JR.
Attesting Officer

ROBERT GOTTSCHALK
Acting Commissioner of Patents